(12) United States Patent
Ootsuka

(10) Patent No.: US 10,008,703 B2
(45) Date of Patent: Jun. 26, 2018

(54) LID FOR BATTERY CASE WITH A SAFETY VALVE

(71) Applicant: NISSHIN STEEL CO., LTD., Tokyo (JP)

(72) Inventor: Masato Ootsuka, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 30 days.

(21) Appl. No.: 14/650,980

(22) PCT Filed: Mar. 11, 2013

(86) PCT No.: PCT/JP2013/056624
§ 371 (c)(1),
(2) Date: Jun. 10, 2015

(87) PCT Pub. No.: WO2014/091773
PCT Pub. Date: Jun. 19, 2014

(65) Prior Publication Data
US 2015/0311488 A1 Oct. 29, 2015

(30) Foreign Application Priority Data

Dec. 11, 2012 (JP) .................................. 2012-270158

(51) Int. Cl.
*H01M 2/12* (2006.01)
*H01M 2/04* (2006.01)
*H01M 10/0525* (2010.01)

(52) U.S. Cl.
CPC ......... *H01M 2/1241* (2013.01); *H01M 2/043* (2013.01); *H01M 2/0404* (2013.01); *H01M 2/04* (2013.01); *H01M 2/0478* (2013.01); *H01M 10/0525* (2013.01)

(58) Field of Classification Search
CPC .. H01M 2/0404; H01M 2/1241; H01M 2/043; H01M 2/04; H01M 2/0478; H01M 10/0525
USPC .......................................................... 429/56
See application file for complete search history.

(56) References Cited

U.S. PATENT DOCUMENTS

| 6,210,825 B1 * | 4/2001 | Takada ................ | H01M 2/1241 429/53 |
| 2014/0017524 A1 * | 1/2014 | Ootsuka ............... | B21D 51/383 429/53 |
| 2014/0220395 A1 * | 8/2014 | Ootsuka .............. | H01M 2/0473 429/56 |

FOREIGN PATENT DOCUMENTS

| JP | 2001-325933 A | 11/2001 |
| JP | 2004-95268 A | 3/2004 |
| JP | 2009-4271 A | 1/2009 |
| JP | 2009-140753 A | 6/2009 |
| JP | 2012-212569 A | 11/2012 |

* cited by examiner

*Primary Examiner* — Gary Harris
(74) *Attorney, Agent, or Firm* — Rothwell, Figg, Ernst & Manbeck, P.C.

(57) ABSTRACT

In a configuration where an annular thin portion 50 is formed integrally with a lid main body 4 by coining, a bulging portion 6 is formed integrally with the lid main body 4 so as to bulge out from the lid main body 4, and the annular thin portion 50 is provided in a flat portion 61 of the bulging portion 6.

13 Claims, 3 Drawing Sheets

LID FOR BATTERY CASE WITH A SAFETY VALVE

CROSS REFERENCE TO RELATED APPLICATIONS

This application is a 35 U.S.C. § 371 National Phase Entry Application from PCT/JP2013/056624, filed Mar. 11, 2013, and designating the United States, which claims priority under 35 U.S.C. § 119 to Japanese Patent Application No. 2012-270158 filed on Dec. 11, 2012, which are incorporated herein by reference in their entireties.

TECHNICAL FIELD

The present invention relates to a lid for a battery case that is formed from a metal plate and constitutes a battery case of a battery.

BACKGROUND ART

As a conventionally employed battery case lid of this type, a configuration disclosed in Patent Document 1 and so on, for example, may be cited. FIG. 6 is an exploded perspective view showing a battery case using a conventional lid. In the drawing, a lid 1 together with a case main body 2 having a closed-end cylindrical shape constitutes a battery case 3. The lid 1 and the case main body 2 are formed from metal plate made of aluminum, an aluminum alloy, nickel-plated steel, stainless steel, or the like. The lid 1 is provided with a lid main body 4 and a safety valve 5. The lid main body 4 is a planar portion formed in a rectangular shape having a short side 40 and a long side 41 when seen from above. The safety valve 5 is provided to prevent the battery case 3 from bursting open when internal pressure of the battery case 3 (referred to hereafter as case internal pressure) rises. When the internal pressure of the battery case 3 exceeds a predetermined value, the safety valve 5 ruptures, thereby releasing the internal pressure of the battery case 3 to the outside. The safety valve 5 includes an annular thin portion 50 formed integrally with the lid main body 4 by performing a coining (pressing) process in which an marking punch is pressed against the metal plate serving as a base material of the lid 1. When the internal pressure of the battery case 3 exceeds the predetermined value, all or a majority of the annular thin portion 50 fractures, thereby rupturing the safety valve 5.

Patent Document 1: Japanese Patent Application Publication No. 2000-285892

DISCLOSURE OF THE INVENTION

The inventors of the present application discovered, while repeatedly manufacturing prototypes of the battery case 3 described above and testing the operation of the safety valve 5, that a unique problem as a result of forming the annular thin portion 50 integrally with the lid main body 4 made of a metal plate by the coining process.

FIG. 7 is an illustrative view showing deformation of the lid 1 shown in FIG. 6 when the case internal pressure rises. As shown in FIG. 7, when the case internal pressure rises, the lid main body 4 of the lid 1 deforms in an arc shape such that a ridge 4c extending in a lengthwise direction 4b of the lid main body 4 is formed substantially centrally in a widthwise direction 4a of the lid main body 4. As a result, tensile stress acting on the annular thin portion 50 of the safety valve 5 disposed in a central portion of the lid main body 4 is greater in the widthwise direction than in the lengthwise direction. On the other hand, an inner peripheral region of the annular thin portion 50 is increased in thickness by the coining process, and therefore, when the case internal pressure rises, the inner peripheral region of the annular thin portion 50 deforms more slowly than the entire lid main body 4. As a result, excessive stress is concentrated in a part of the annular thin portion 50 away from the ridge 4c (a part on the long side 41 side of the lid main body 4).

When the stress acting on the annular thin portion 50 is excessively concentrated in a part of the annular thin portion 50, only this part fractures. In this case, the internal pressure of the battery case 3 is relieved through the fractured part, and therefore the safety valve 5 cannot rupture normally. As a result, the speed at which the case internal pressure is released decreases (this condition is known as a slow leak). In other words, with the conventional configuration described above, no measures are taken to avoid stress concentration accompanying deformation of the lid main body 4 when the case internal pressure rises, and as a result, the safety valve 5 may be unable to rupture normally.

The present invention has been designed to solve the problem described above, and an object thereof is to provide a lid for a battery case with which excessive stress concentration in a part of an annular thin portion can be avoided so that a safety valve can be ruptured more reliably.

A lid for a battery case according to the present invention, which is formed from a metal plate that constitutes a battery case, includes: a lid main body that is formed in a rectangular shape having a short side and a long side when seen from above; a safety valve that includes an annular thin portion formed integrally with the lid main body by coining, and which ruptures when an internal pressure of the battery case exceeds a predetermined value, thereby releasing the internal pressure of the battery case to the outside; and a bulging portion formed integrally with the lid main body so as to bulge out from the lid main body, wherein the bulging portion includes a vertical wall that extends from the lid main body, and a flat portion provided on an end portion of the vertical wall such that a periphery thereof is surrounded by the vertical wall, and the safety valve is provided in the flat portion of the bulging portion.

With the lid for a battery case according to the present invention, the safety valve is provided in the flat portion of the bulging portion formed integrally with the lid main body so as to bulge out from the lid main body, and therefore deformation in a peripheral region of the annular thin portion can be suppressed when the internal pressure of the case rises. Accordingly, excessive stress concentration in a part of the annular thin portion can be avoided, and as a result, the safety valve can be ruptured more reliably.

BEST MODE FOR CARRYING OUT THE INVENTION

Embodiments of the present invention will be described below with reference to the drawings.

First Embodiment

Figure 1:
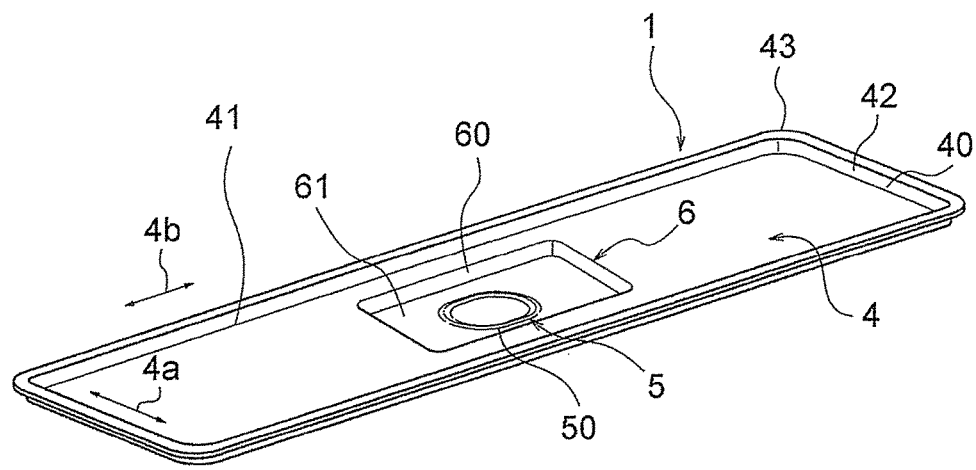
FIG. 1 is a perspective view showing a lid for a battery case according to a first embodiment of the present invention.
Figure 2:
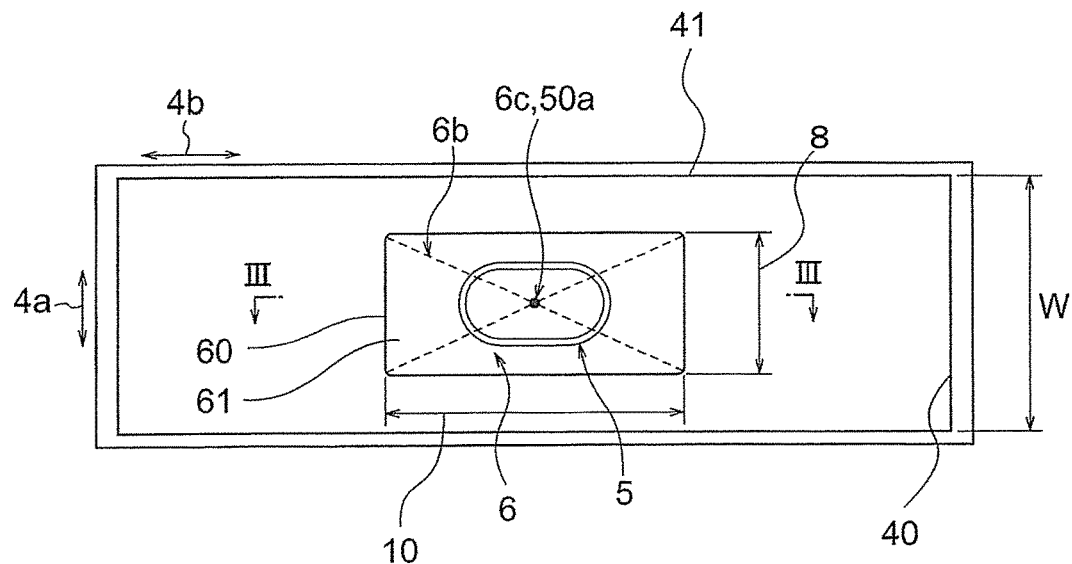
FIG. 2 is a plan view showing the lid of FIG. 1.
Figure 3:
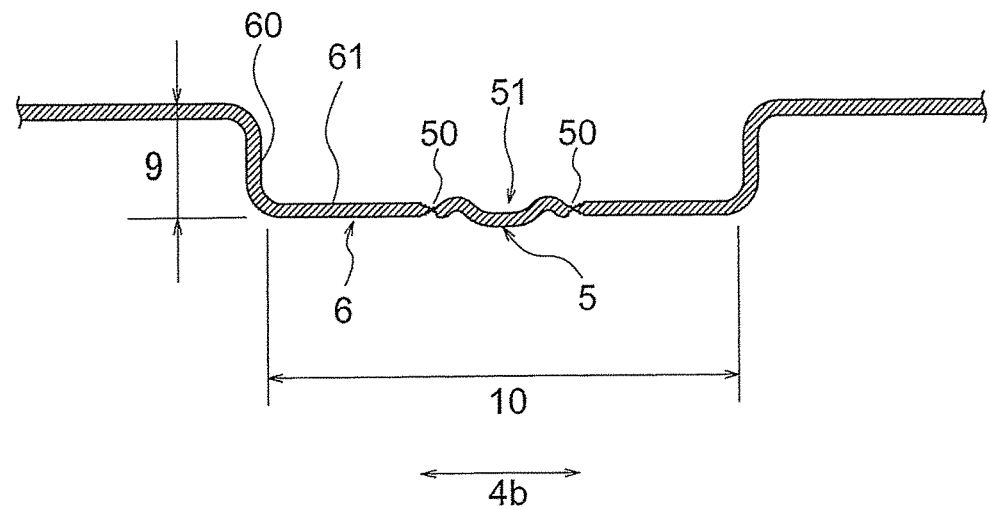
FIG. 3 is a sectional view taken along a III-III line in FIG. 2.
Figure 6:
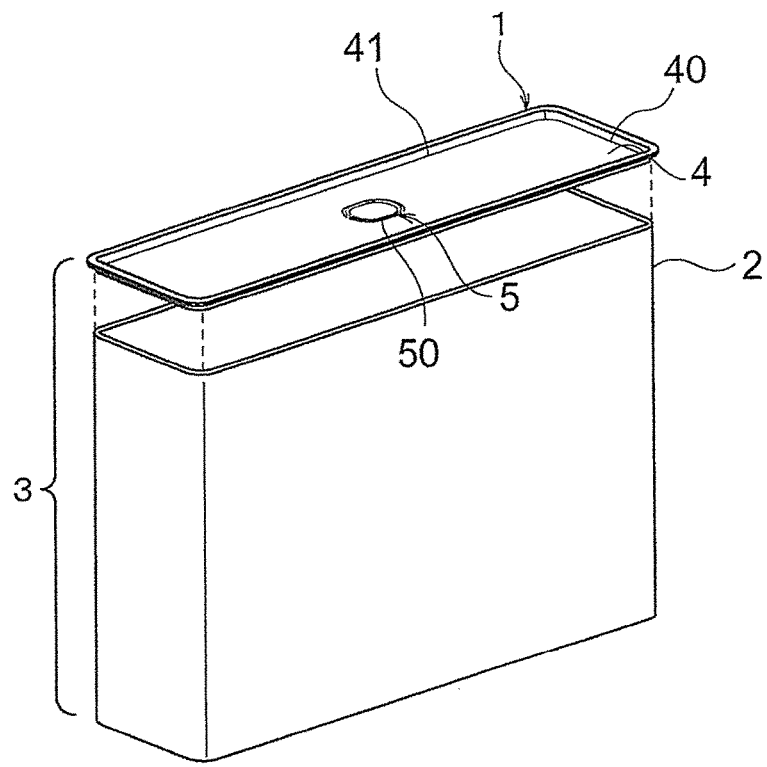
FIG. 6 is an exploded perspective view showing a battery case employing a conventional lid.
Figure 7:
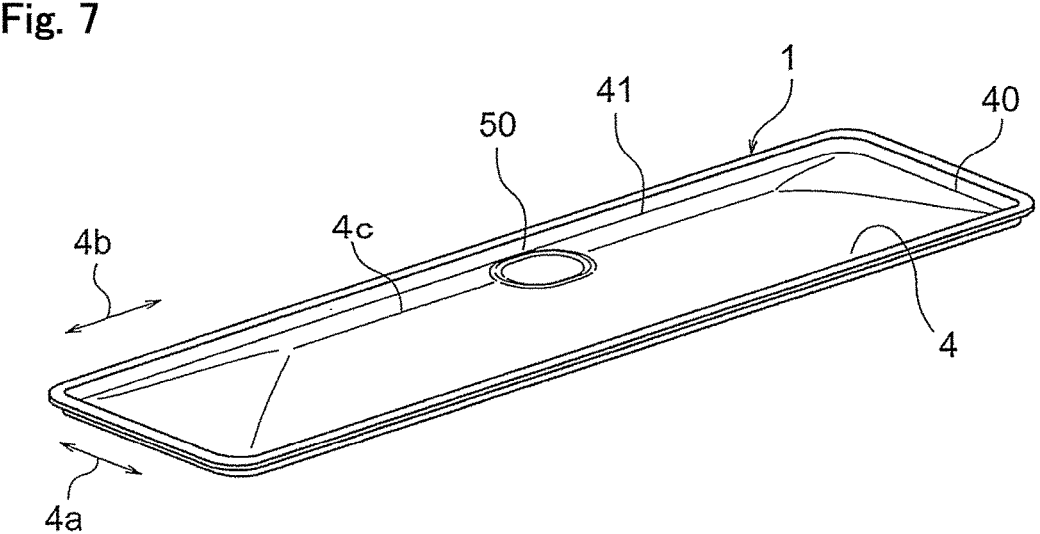
FIG. 7 is an illustrative view showing deformation of the lid shown in FIG. 6 when the case internal pressure rises.

FIG. 1 is a perspective view showing a lid 1 for a battery case 3 according to a first embodiment of the present invention, FIG. 2 is a plan view showing the lid 1 of FIG. 1, and FIG. 3 is a sectional view taken along a III-III line in FIG. 2. Note that parts identical or equivalent to the conventional battery case lid (see FIGS. 6 and 7) will be described using identical reference numerals. The lid 1 shown in FIG. 1 together with the case main body 2 (see FIG. 6) having a cylindrical shape, constitutes the battery case 3 (see FIG. 6), which is used to house an electrolyte in a battery such as a lithium ion battery, for example. The entire lid 1 is formed from a metal plate made of stainless steel.

The lid 1 includes the lid main body 4, the safety valve 5, and a bulging portion 6. As shown in FIG. 2, the lid main body 4 is a substantially planar flat plate portion formed in a rectangular shape having the short side 40 and the long side 41 when seen from above. A side wall portion 42 stands upright from an outer edge of the lid main body 4 in a plate thickness direction of the lid main body 4. A flange portion 43 is bent substantially at a right angle from a tip end portion of the side wall portion 42.

The safety valve 5 includes the annular thin portion 50 and a bent portion 51. The annular thin portion 50 is an elliptical groove constituting an edge portion of the safety valve 5, and is formed integrally with the lid main body 4 by implementing coining in a plurality of stages on the metal plate serving as the base material of the lid 1. As shown in FIG. 3, the annular thin portion 50 is thinner than the remaining plate surface of the lid 1 so that when the case internal pressure of the battery case 3 exceeds a predetermined value, the annular thin portion 50 fractures first, thereby causing the entire safety valve 5 to rupture. The bent portion 51 is a plate portion located on an inner peripheral side of the annular thin portion 50, which deforms so as to bend in the plate thickness direction while absorbing excess thickness generated when the annular thin portion 50 is formed by coining (see FIG. 3).

The bulging portion 6 is formed integrally with the lid main body 4 by bulging processing such as pressing, for example, so as to bulge out from the lid main body 4. The bulging portion 6 includes a vertical wall 60 and a flat portion 61. The vertical wall 60 is a wall that extends from the lid main body 4 in the plate thickness direction of the lid main body 4. The flat portion 61 is a flat plate portion provided on an end portion of the vertical wall 60 such that a periphery thereof is surrounded by the vertical wall 60, and is formed in a rectangular shape when seen from above, as in FIG. 2. In other words, according to this embodiment, the bulging portion 6 as a whole is formed in the shape of an angular tube having a square cross-section. The vertical wall 60 preferably extends vertically from the lid main body 4 in the plate thickness direction of the lid main body 4. By surrounding the periphery of the flat portion 61 with a wall surface that is perpendicular to the lid main body 4, an improvement in rigidity against the case internal pressure (the internal pressure of the battery case 3) can be achieved.

Here, as with the conventional configuration, it may be impossible to ensure that the safety valve 5 ruptures normally if, following an increase in the case internal pressure (the internal pressure of the battery case 3), the entire lid main body 4 deforms in an arc shape (see FIG. 7) such that the ridge 4c extending in the lengthwise direction 4b of the lid main body 4 is formed substantially centrally in the widthwise direction 4a of the lid main body 4. In this embodiment, however, the safety valve 5 (the annular thin portion 50) is provided in the flat portion 61 of the bulging portion 6, and therefore rigidity against deformation of the lid main body 4 in the manner shown in FIG. 7 can be obtained in the peripheral region of the annular thin portion 50.

A widthwise direction length 8 (see FIG. 2) of the flat portion 61 in the widthwise direction 4a is set at no more than 0.75 W, where W is the length of the short side 40 of the lid main body 4. A height 9 (see FIG. 3) of the vertical wall 60 in the plate thickness direction of the lid main body 4 is set at no less than 1.25 t, where t is a plate thickness of the lid main body 4. A lengthwise direction length 10 (see FIG. 2) of the flat portion 61 in the lengthwise direction 4b is set at no more than 1.5 W. The significance of these dimensions will be shown in examples described below.

When the battery case 3 is formed from the lid 1 and the case main body 2, the bulging portion 6 may be formed to bulge toward either the exterior or the interior of the battery case 3. However, the bulging portion 6 is preferably formed to bulge toward the interior of the battery case 3. By forming the bulging portion 6 to bulge toward the interior of the battery case 3, greater rigidity against stress acting on the bulging portion 6 when the case internal pressure rises can be obtained.

In this embodiment, the annular thin portion 50 is formed in a point symmetrical shape and disposed such that a central position 50a (a center point) of the annular thin portion 50 is aligned with an intersection 6c between two diagonals 6b linking opposite corners of the flat portion 61 (see FIG. 2). By aligning the intersection 6c between the diagonals 6b with the central position 50a of the annular thin portion 50 in this manner, stress can be dispersed as evenly as possible over the entire annular thin portion 50 when the peripheral region of the annular thin portion 50 deforms.

Figure 4:
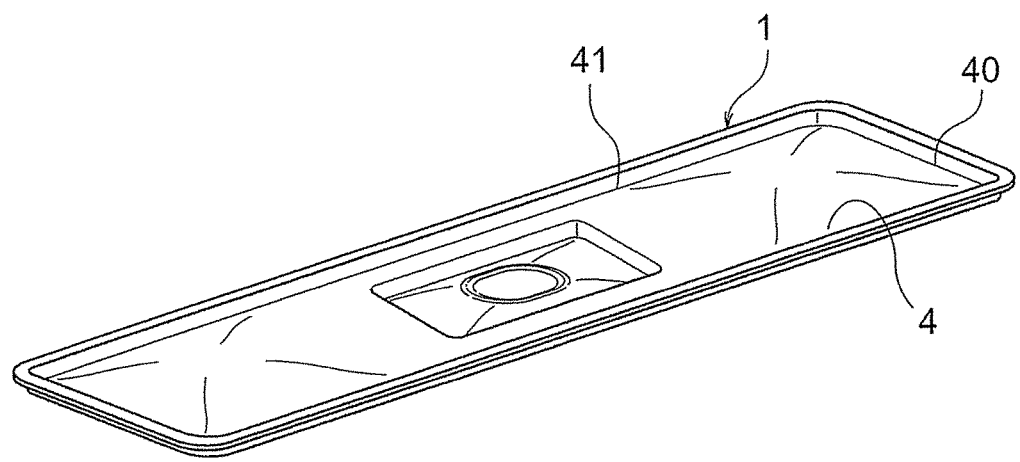
FIG. 4 is an illustrative view showing deformation of the lid shown in FIG. 1 when case internal pressure rises.

Next, an action thereof will be described. FIG. 4 is an illustrative view showing deformation of the lid 1 shown in FIG. 1 when the case internal pressure rises. As shown in FIG. 4, the annular thin portion 50 and the peripheral region thereof are provided in the flat portion 61 (inside the vertical wall 60) of the bulging portion 6, and therefore deformation of the lid main body 4 occurring when the case internal pressure rises is unlikely to extend to the annular thin portion 50 and the peripheral region thereof. In comparison with the conventional configuration, therefore, deformation in the peripheral region of the annular thin portion 50 can be suppressed, with the result that excessive stress concentration in a part of the annular thin portion 50 accompanying deformation of the lid main body 4 following an increase in the case internal pressure can be avoided. Accordingly, partial fracturing of the annular thin portion 50, leading to a slow leak, can be prevented, and as a result, the safety valve 5 can be ruptured more reliably.

Next, examples will be described. The present inventors manufactured the lid 1 shown in FIG. 1 using SUS 430 plate having a thickness of 0.8 mm as a base material, and manufactured the battery case 3 by welding the lid 1 to the case main body 2. The long side 41 of the lid main body 4 was set at 160 mm, the short side 40 of the lid main body 4 was set at 40 mm, and the overall height of the battery case 3 was set at 100 mm. Here, the length of the short side 40 of the lid main body 4 is assumed to be W. The length W is a reference length to be taken into consideration when defining the shape of the bulging portion 6 according to the present invention.

Further, the annular thin portion 50 of the safety valve 5 was formed as a 10 mm×15 mm ellipse, and by implementing coining in multiple stages, the thickness of the thinnest portion of the annular thin portion 50 was set at 50 μm. The target range of the operating internal pressure of the safety valve 5 was set at 0.8 to 1.4 MPa.

The bulging portion 6 was formed to bulge toward the interior of the battery case 3 in the position shown in FIG. 1. As regards the dimensions of the bulging portion 6, the widthwise direction length 8 of the flat portion 61 in the widthwise direction 4a was set at 20 mm, the height 9 of the vertical wall 60 was set at 2 mm, and the lengthwise direction length 10 of the flat portion 61 was set at 24 mm. Note that in the bulging processing performed to cause the bulging portion 6 to bulge out from the lid main body 4, a punch radius and a die radius were set at 2 mm, while a radius of a corner portion of a substantially square bulging portion was set at 3 mm. Further, a battery case 3 using the conventional lid not provided with the bulging portion 6 was manufactured for comparison.

After manufacturing the battery case 3 as described above, a hydraulic tester was connected to a bottom surface (a surface opposing the lid 1) of the battery case 3, whereupon pressure was applied to the interior of the battery case 3 without restraining the periphery of the battery case 3. Results of the operating condition and the operating pressure of the safety valve 5 are shown below on Table 1. Note that a rupturing condition of the safety valve 5 was determined by sight.

TABLE 1

|  | Without bulging portion | With bulging portion |
|---|---|---|
| Operating pressure/MPa | 0.8 | 1.2 |
| Operating condition | Slow leak | Rupture |
|  | x | ○ |

As shown on Table 1, in the battery case 3 using the conventional lid 1 not provided with the bulging portion 6, a part of the annular thin portion 50 fractured upon application of a pressure of 0.8 MPa, causing a slow leak. In the battery case 3 using the lid 1 provided with the bulging portion 6, on the other hand, it was confirmed that the safety valve 5 ruptured normally upon application of a pressure of 1.2 MPa.

Next, a similar test was performed after modifying only the widthwise direction length 8 of the flat portion 61 within a range of 18 mm to 30 mm from the dimensions of the bulging portion 6 described above. Results are shown on Table 2.

TABLE 2

| | No. | | | | | | | |
|---|---|---|---|---|---|---|---|---|
| | 1 | 2 | 3 | 4 | 5 | 6 | 7 | 8 |
| Widthwise direction length (mm) | 18 | 20 | 22 | 24 | 26 | 28 | 30 | 32 |
| Ratio to reference length W | 0.45 | 0.5 | 0.55 | 0.6 | 0.65 | 0.7 | 0.75 | 0.8 |
| Operating pressure (MPa) | 1.2 | 1.2 | 1.2 | 1.2 | 1.1 | 1.1 | 1.1 | 1.0 |
| Operating condition | Rupture ○ | Rupture ○ | Rupture ○ | Rupture ○ | Rupture ○ | Rupture ○ | Rupture ○ | Slow leak x |

As shown on Table 2, when the widthwise direction length 8 was set at no more than 28 mm (i.e. when the widthwise direction length 8 was set at no more than 0.75 W relative to the reference length W (=40 mm)), it was confirmed that the safety valve 5 ruptured normally, but when the widthwise direction length 8 was set at 32 mm (i.e. when the widthwise direction length 8 was increased beyond 0.75 W), a part of the annular thin portion 50 fractured, causing a slow leak. The reason for this is thought to be that when the widthwise direction length 8 is large, deformation advances over a wide region on the periphery of the annular thin portion 50 following an increase in the case internal pressure, and since the deformation in this region cannot be suppressed, the tensile stress acting on the annular thin portion 50 increases to a greater extent in the widthwise direction than in the lengthwise direction, with the result that this stress cannot be dispersed evenly.

Next, a similar test was performed after modifying only the height 9 of the vertical wall 60 within a range of 0.8 mm to 2.0 mm from the dimensions of the bulging portion 6 described above. Results are shown on Table 3.

TABLE 3

| No. | 1 | 2 | 3 | 4 | 5 |
|---|---|---|---|---|---|
| Height (mm) | 0.8 | 1.0 | 1.2 | 1.6 | 2.0 |
| Ratio to plate thickness t | 1.0 | 1.25 | 1.5 | 2.0 | 2.5 |
| Operating pressure (MPa) | 0.9 | 1.0 | 1.1 | 1.2 | 1.2 |
| Operating condition | Slow leak | Rupture | Rupture | Rupture | Rupture |
|  | x | ○ | ○ | ○ | ○ |

As shown on Table 3, when the height 9 of the vertical wall 60 was set at no less than 1.0 mm (i.e. when the height 9 of the vertical wall 60 was set at no less than 1.25 t, where t is the thickness of the lid main body 4 (=0.8 mm)), it was confirmed that the safety valve 5 ruptured normally, but when the height 9 of the vertical wall 60 was set at 0.8 mm (i.e. when the height 9 of the vertical wall 60 was reduced below 1.25 t), a part of the annular thin portion 50 fractured, causing a slow leak. The reason for this is thought to be that when the height 9 of the vertical wall 60 is low, the vertical wall 60 is not rigid enough to be able to withstand the stress generated when the lid main body 4 deforms due to an increase in the case internal pressure, and therefore deformation in the peripheral region of the annular thin portion 50 cannot be suppressed.

Next, a similar test was performed after modifying only the lengthwise direction length 10 of the flat portion 61 within a range of 20 mm to 70 mm from the dimensions of the bulging portion 6 described above. Results are shown on Table 4.

TABLE 4

|  | No. | | | | | |
|---|---|---|---|---|---|---|
|  | 1 | 2 | 3 | 4 | 5 | 6 |
| Lengthwise direction length (mm) | 20 | 24 | 28 | 40 | 60 | 70 |
| Ratio to reference length W | 0.5 | 0.6 | 0.7 | 1.0 | 1.5 | 1.75 |
| Operating pressure (MPa) | 1.2 | 1.2 | 1.2 | 1.1 | 1.1 | 1.0 |
| Operating condition | Rupture | Rupture | Rupture | Rupture | Rupture | Slow leak |
|  | ○ | ○ | ○ | ○ | ○ | X |

As shown on Table 4, when the lengthwise direction length 10 was set at no more than 60 mm (i.e. when the lengthwise direction length 10 was set at no more than 1.5 W relative to the reference length W (=40 mm)), it was confirmed that the safety valve 5 ruptured normally, but when the lengthwise direction length 10 was set at 70 mm (i.e. when the lengthwise direction length 10 was increased beyond 1.5 W), a part of the annular thin portion 50 fractured, causing a slow leak. The reason for this is thought to be that when the lengthwise direction length 10 of the flat portion 61 is long, rigidity cannot be secured in the peripheral region of the annular thin portion 50, and therefore deformation in this region cannot be suppressed.

In the lid 1 for the battery case 3, the annular thin portion 50 is provided in the flat portion 61 of the bulging portion 6 that is formed integrally with the lid main body 4 to bulge out from the lid main body 4, and therefore deformation in the peripheral region of the annular thin portion 50 can be suppressed when the case internal pressure rises. Accordingly, excessive stress concentration in a part of the annular thin portion 50 can be avoided, and as a result, the safety valve 5 can be ruptured more reliably. When the metal plate forming the lid 1 is made of stainless steel, it is difficult to ensure that the annular thin portion 50 ruptures with stability due to the great strength of stainless steel compared to aluminum and the like, but when the annular thin portion 50 and the peripheral region thereof are provided in the flat portion 61 of the bulging portion 6, as in this embodiment, the safety valve 5 can be ruptured more reliably. In other words, the present invention is particularly effective in a case where the metal plate forming the lid 1 is made of stainless steel.

Further, the widthwise direction length 8 of the flat portion 61 is set at no more than 0.75 W, the height 9 of the vertical wall 60 is set at no less than 1.25 t, and the lengthwise direction length 10 of the flat portion 61 is set at no more than 1.5 W, and therefore excessive stress concentration in a part of the annular thin portion 50 can be avoided more reliably. As a result, the safety valve 5 can be ruptured even more reliably.

Moreover, the bulging portion 6 is formed to bulge toward the interior of the battery case 3 from the lid main body 4, and therefore greater rigidity against the stress that acts on the bulging portion 6 when the case internal pressure rises can be obtained. As a result, excessive stress concentration in a part of the annular thin portion 50 can be avoided even more reliably.

Second Embodiment

Figure 5:
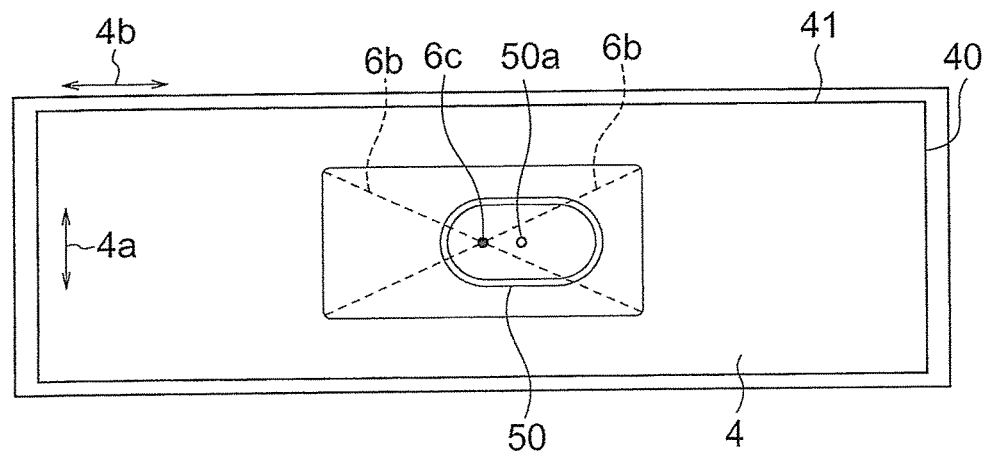
FIG. 5 is a plan view showing a lid for a battery case according to a second embodiment of the present invention.

FIG. 5 is a plan view showing the lid 1 for a battery case according to a second embodiment of the present invention. In the first embodiment, as described above (see FIG. 2), the central position 50a (the center point) of the annular thin portion 50 is disposed in alignment with the intersection 6c between the two diagonals 6b linking the opposite corners of the flat portion 61, whereas in the second embodiment, the annular thin portion 50 is disposed in a position such that the intersection 6c between the two diagonals 6b linking the corners of the flat portion 61 is located within the annular thin portion 50 and is not in alignment with the central position 50a of the annular thin portion 50. Note that the interior of the annular thin portion 50 includes the annular thin portion 50 itself as well as the inner side of the annular thin portion 50. All other configurations are similar to the first embodiment.

Next, an action thereof will be described. When the case internal pressure rises, the peripheral region of the annular thin portion 50 deforms in such a manner that the corners of the flat portion 61 form base ends of the deformation, as shown in FIG. 4 and so on, for example. Therefore, by aligning the intersection 6c between the diagonals 6b with the central position 50a of the annular thin portion 50, as in the first embodiment, the stress generated when the peripheral region of the annular thin portion 50 deforms is dispersed evenly over the entire annular thin portion 50.

When, on the other hand, the annular thin portion 50 is disposed such that the intersection 6c and the central position 50a are not aligned (i.e. are offset), as shown in FIG. 5, the stress applied to the annular thin portion 50 varies on a gradient in accordance with an offset direction and an offset amount of the offset of the central position 50a from the intersection 6c. Advancement of the fracturing of the annular thin portion 50 can be adjusted using this stress gradient.

More specifically, when the annular thin portion 50 is disposed such that the central position 50a is positioned on a right-hand side of the intersection 6c, as shown in FIG. 5, the annular thin portion 50 starts to fracture from a left end thereof. By adjusting the offset amount at this time, the greater part of the annular thin portion 50 can be caused to fracture while ensuring that a part of the annular thin portion 50 remains connected to the lid main body 4. With this configuration, it is possible to prevent the safety valve 5 from falling off the battery case 3 after the safety valve 5 ruptures.

In the lid 1 for the battery case 3 according to this embodiment, the annular thin portion 50 is disposed in a position such that the intersection 6c between the two diagonals 6b linking the corners of the flat portion 61 is located within the annular thin portion 50 and is not in alignment with the central position 50a of the annular thin portion 50, and therefore the stress acting on the annular thin portion 50 can be varied intentionally on a gradient. This stress gradient can then be used to adjust advancement of the fracturing of the annular thin portion 50.

The invention claimed is:

1. A lid for a battery case that is formed from a metal plate that constitutes the battery case (3), comprising: a lid main body (4) that is formed in a rectangular shape having a short side (40) and a long side (41); a safety valve (5) that includes an annular thin portion (50) formed integrally with the lid main body (4) by coining, and which ruptures when an internal pressure of the battery case (3) exceeds a predetermined value, thereby releasing the internal pressure of the battery case (3) to the outside; and a bulging portion (6) formed integrally with the lid main body (4) so as to bulge out from the lid main body (4), wherein the bulging portion (6) includes a vertical wall (60) that extends from the lid main body (4), and a flat portion (61) provided on an end portion of the vertical wall (60) such that a periphery thereof is surrounded by the vertical wall (60), wherein the annular thin portion (50) of the safety valve (5) is provided in the flat portion (61) of the bulging portion (6), and wherein the safety valve (5) and the bulging portion (6) are integrally formed as a single unitary body with the lid main body (4); wherein a widthwise direction length (8) of the flat portion (61) in a widthwise direction (4a) of the lid main body (4) is set at no more than 0.75 W, where W is a length of the short side (40), a height (9) of the vertical wall (60) in a plate thickness direction of the lid main body (4) is set at no less than 1.25 t, where t is a plate thickness of the lid main body (4), and a lengthwise direction length (10) of the flat portion (61) in a lengthwise direction (4b) of the lid main body (4) is set at no more than 1.5 W.

2. The lid for a battery case according to claim 1, wherein the flat portion (61) is provided in a rectangular shape when seen from above, and the annular thin portion (50) is disposed in a position such that an intersection (6c) between two diagonals (6b) linking respective corners of the flat portion (61) is located within the annular thin portion (50) and is not in alignment with a central position (50a) of the annular thin portion (50).

3. The lid for a battery case according to claim 1, wherein the bulging portion (6) is formed to bulge from the lid main body (4) toward an interior of the battery case (3).

4. The lid for a battery case according to claim 1, wherein the metallic plate is made of stainless steel.

5. The lid for a battery case according to claim 1, wherein the flat portion (61) is provided in a rectangular shape when seen from above, and the annular thin portion (50) is disposed in a position such that an intersection (6c) between two diagonals (6b) linking respective corners of the flat portion (61) is located within the annular thin portion (50) and is not in alignment with a central position (50a) of the annular thin portion (50).

6. The lid for a battery case according to claim 1, wherein the bulging portion (6) is formed to bulge from the lid main body (4) toward an interior of the battery case (3).

7. The lid for a battery case according to claim 2, wherein the bulging portion (6) is formed to bulge from the lid main body (4) toward an interior of the battery case (3).

8. The lid for a battery case according to claim 1, wherein the plate is made of stainless steel.

9. The lid for a battery case according to claim 2, wherein the metallic plate is made of stainless steel.

10. The lid for a battery case according to claim 3, wherein the metallic plate is made of stainless steel.

11. The lid for a battery case according to claim 1, wherein the lid main body, the safety valve, and the bulging portion are each entirely formed from the metal plate.

12. The lid for a battery case according to claim 1, wherein the annular thin portion is an elliptical groove defining an edge portion of the safety valve, and the safety valve includes a bent portion surrounded by the elliptical groove.

13. The lid for a battery case according to claim 1 further comprising a side wall (42) projecting upright from an outer edge of the lid main body (4) in a plate thickness direction of the lid main body (4).

* * * * *